(12) United States Patent
Manzini

(10) Patent No.: US 12,134,442 B2
(45) Date of Patent: Nov. 5, 2024

(54) ELECTRIC GEARMOTOR ASSEMBLY FOR BICYCLES

(71) Applicant: RMU Project S.R.L., Reggio Emilia (IT)

(72) Inventor: Andrea Manzini, Reggio Emilia (IT)

(73) Assignee: RMU Project S.R.L., Reggio Emilia (IT)

( * ) Notice: Subject to any disclaimer, the term of this patent is extended or adjusted under 35 U.S.C. 154(b) by 451 days.

(21) Appl. No.: 17/614,871

(22) PCT Filed: Apr. 15, 2020

(86) PCT No.: PCT/IB2020/053533
§ 371 (c)(1),
(2) Date: Nov. 29, 2021

(87) PCT Pub. No.: WO2020/250049
PCT Pub. Date: Dec. 17, 2020

(65) Prior Publication Data
US 2022/0219780 A1 Jul. 14, 2022

(30) Foreign Application Priority Data

Jun. 10, 2019 (IT) .......................... 102019000008541

(51) Int. Cl.
*B62M 6/55* (2010.01)
*B62M 6/50* (2010.01)

(52) U.S. Cl.
CPC ................ *B62M 6/55* (2013.01); *B62M 6/50* (2013.01)

(58) Field of Classification Search
CPC ................................ B62M 6/55; B62M 6/50
See application file for complete search history.

(56) References Cited

U.S. PATENT DOCUMENTS

| 9,616,969 | B2 * | 4/2017 | MacMartin | B60K 1/00 |
| 11,433,970 | B2 * | 9/2022 | Noda | B62M 6/55 |

(Continued)

FOREIGN PATENT DOCUMENTS

| CH | 593822 A5 | 12/1977 |
| CN | 2234906 Y | 9/1996 |

(Continued)

*Primary Examiner* — Kevin Hurley
(74) *Attorney, Agent, or Firm* — Dickinson Wright PLLC; Andrew D. Dorisio

(57) ABSTRACT

Herein described is a gearmotor assembly for bicycles comprising a pedal crank shaft, an electric motor provided with an electronic control unit, a reduction gear mechanism and a gear wheel, arranged coaxially around the pedal crank shaft. The gearmotor assembly further comprises two internal overrunning clutches, mounted coaxially around the pedal crank shaft and configured to transmit torque in a first direction of rotation of the pedal crank shaft, and an external overrunning clutch, mounted coaxially inside the gear wheel and configured to transmit torque in a second direction of rotation of the pedal crank shaft which is opposite with respect to the first direction of rotation. A hollow tubular element kinematically connected to the drive wheel for transmitting the torque is interposed between the internal and external overrunning clutches. The internal overrunning clutches are housed by interference inside the hollow tubular element, while the external overrunning clutch is housed externally by interference. The pedal crank shaft is provided with two opposite rectified seats, around each of which a respective internal overrunning clutch is mounted by interference. The internal overrunning clutches are then arranged directly at contact with the pedal crank shaft. The hollow tubular element forms the outer housing of the internal overrunning clutches and it consists of a rectified tube around which the gear wheel, within which the external (Continued)

overrunning clutch is coaxially mounted, is centrally housed.

8 Claims, 5 Drawing Sheets

(56) References Cited

U.S. PATENT DOCUMENTS

| | | | | |
|---|---|---|---|---|
| 11,904,973 B2* | 2/2024 | Nishimori | ............. | B62J 45/412 |
| 2018/0244342 A1* | 8/2018 | Macmartin | ........... | B60W 10/08 |

FOREIGN PATENT DOCUMENTS

| | | |
|---|---|---|
| CN | 202847957 U | 4/2013 |
| CN | 104979936 A | 10/2015 |
| DE | 202011100442 U1 | 1/2012 |
| JP | H01186487 A | 7/1989 |
| JP | H101085 A | 1/1998 |
| WO | WO-2023079471 A1 * | 5/2023 |

* cited by examiner

ELECTRIC GEARMOTOR ASSEMBLY FOR BICYCLES

TECHNICAL FIELD

The present invention generally regards a gearmotor assembly for a bicycle and, in particular, an electric gearmotor assembly for a so-called pedal-assisted bicycle or "e-bike". It is specified that, in this context, the expression pedal-assisted bicycle is used to indicate any vehicle with one (unicycle), two, three (tricycle) or more wheels (quadricycle, rickshaw, etc.) which is both driven by human muscle force and provided with at least one auxiliary electric motor.

BACKGROUND

As known, a pedal-assisted bicycle or "e-bike" is a conventional bicycle to which at least one electric motor, one or more batteries and several sensors which detect, instant by instant, the speed of rotation of the pedal crank/pedal assembly, are applied. This speed of rotation is coded by an electronic control unit which, based on predefined parameters, calibrates the additional support provided by the electric motor to the action of the cyclist.

To date, pedal-assisted bicycles use brushless electric motors coupled to various types of reduction gears, which drive the shaft on which the pedal crank/pedal assembly rotates. Problems related to this type of gearmotors generally arise from dimensions, weight and operating temperatures. The transmissions often have multiple reduction stages and they are sometimes coupled to electromagnetic clutches which, operating within the same crankcases in which the reduction gear is arranged, entail an overheating of the entire gearmotor assembly and therefore loss of efficiency. Furthermore, the considerable dimensions of the transmission require the mounting, and therefore the positioning, of the electric motor on the bicycle frame. Lastly, since the general efficiency of these electric motors does not exceed 0.7, there generally arises the need to over-dimension the electric motor in order to achieve the required power. As a matter of fact, when under intense use, the electric motor tends to overheat and, since it cannot cool, it requires an intervention of the electronic control unit which consists in a reduction of the current supplied and, consequently, a reduction of the general performance of the electric motor.

Another problem of the current gearmotor assemblies for pedal-assisted bicycles lies in the fact that, in the event of non-use, the electric motor still remains connected to the shaft on which the pedal crank/pedal assembly rotates. Thus, during normal or non-assisted pedaling, the cyclist is forced to also drive the electric motor with the relative transmission.

A gearmotor assembly for bicycles according to the prior art is described, for example, in document CN 2234906 Y.

SUMMARY

Thus, the object of the present invention is to provide a gearmotor assembly for a bicycle, in particular an electric gearmotor assembly for a so-called pedal-assisted bicycle or "e-bike", which is capable of overcoming the aforementioned drawbacks of the prior art in an extremely simple, cost-effective and particularly functional manner.

In detail, an object of the present invention is to provide a gearmotor assembly for a pedal-assisted bicycle which, should the electric motor fail to intervene and therefore of normal or non-assisted pedaling, allows the cyclist not to have to drive such electric motor, with the relative transmission.

Another object of the present invention is to provide a gearmotor assembly for a pedal-assisted bicycle which allows to increase both the efficiency of the electric motor and the duration of the battery pack.

These and other objects according to the present invention are attained by providing a gearmotor assembly for a pedal-assisted bicycle.

Further features of the invention are highlighted by the dependent claims, which are an integral part of the present description.

BRIEF DESCRIPTION OF THE DRAWINGS

The features and advantages of a gearmotor assembly for a pedal-assisted bicycle according to the present invention will become more apparent from the following description, provided by way of non-limiting example, with reference to the attached schematic drawings, wherein.

DETAILED DESCRIPTION

Figure 1:
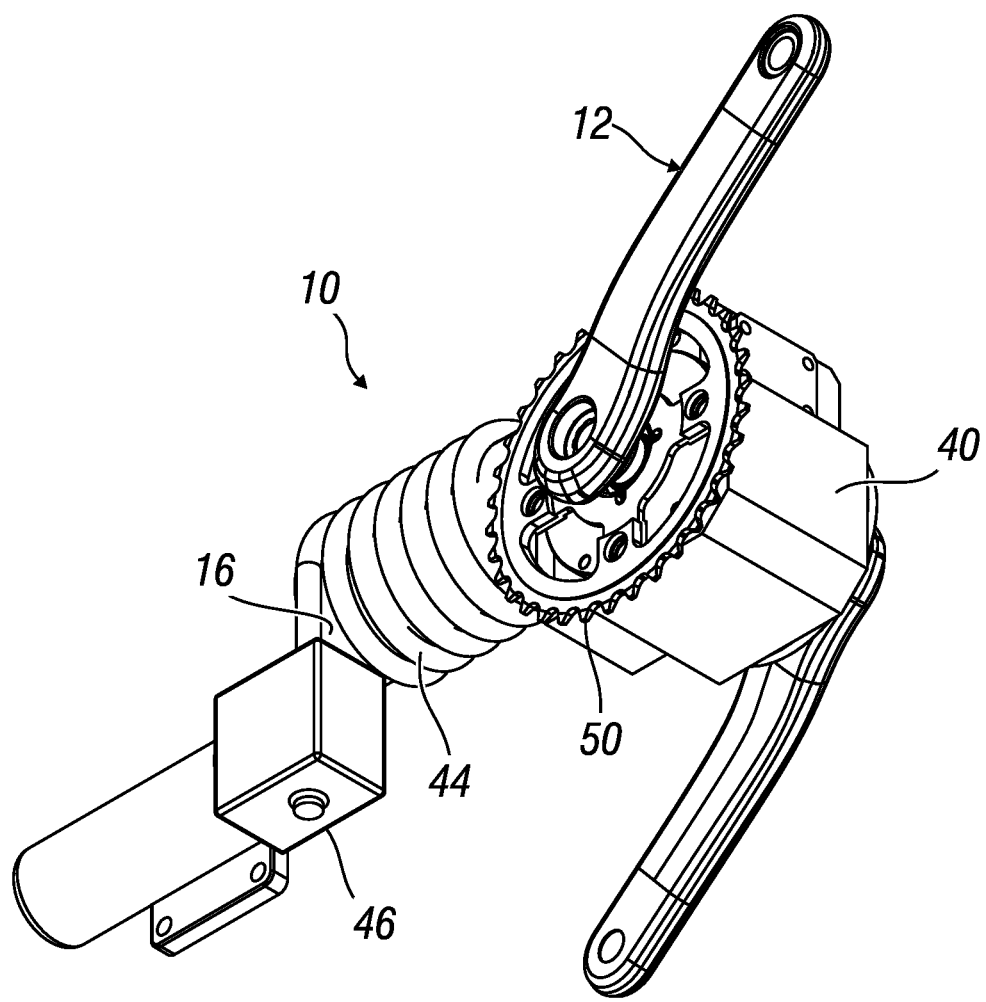
FIG. 1 is a perspective view of a preferred embodiment of the gearmotor assembly for a pedal-assisted bicycle according to the present invention.
Figure 2:
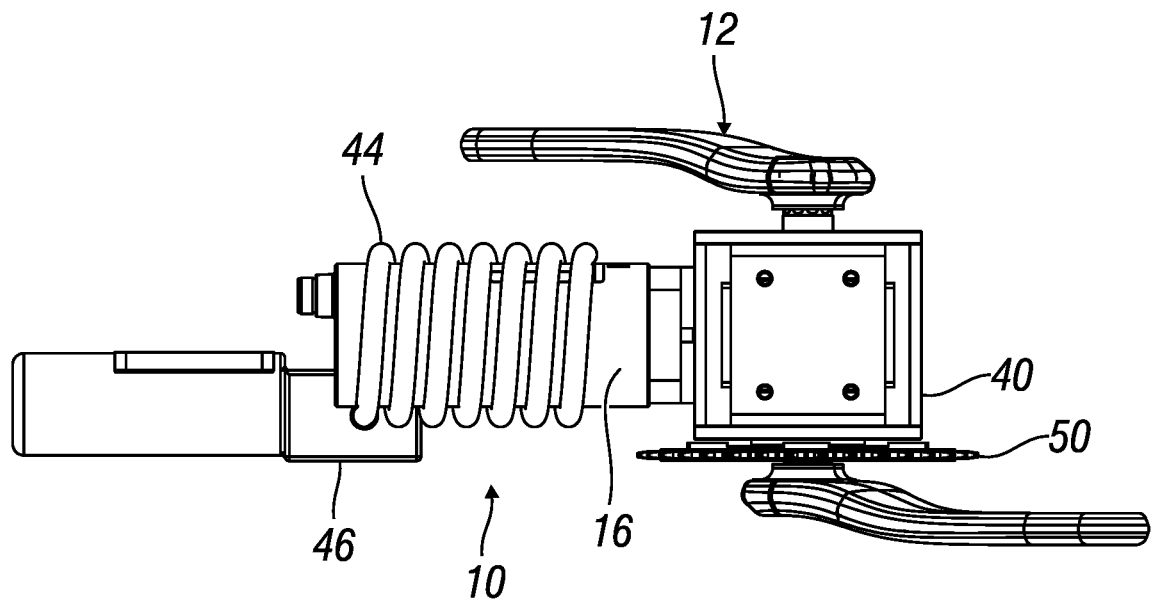
FIG. 2 is a top plan view of the gearmotor assembly of FIG. 1.
Figure 3:
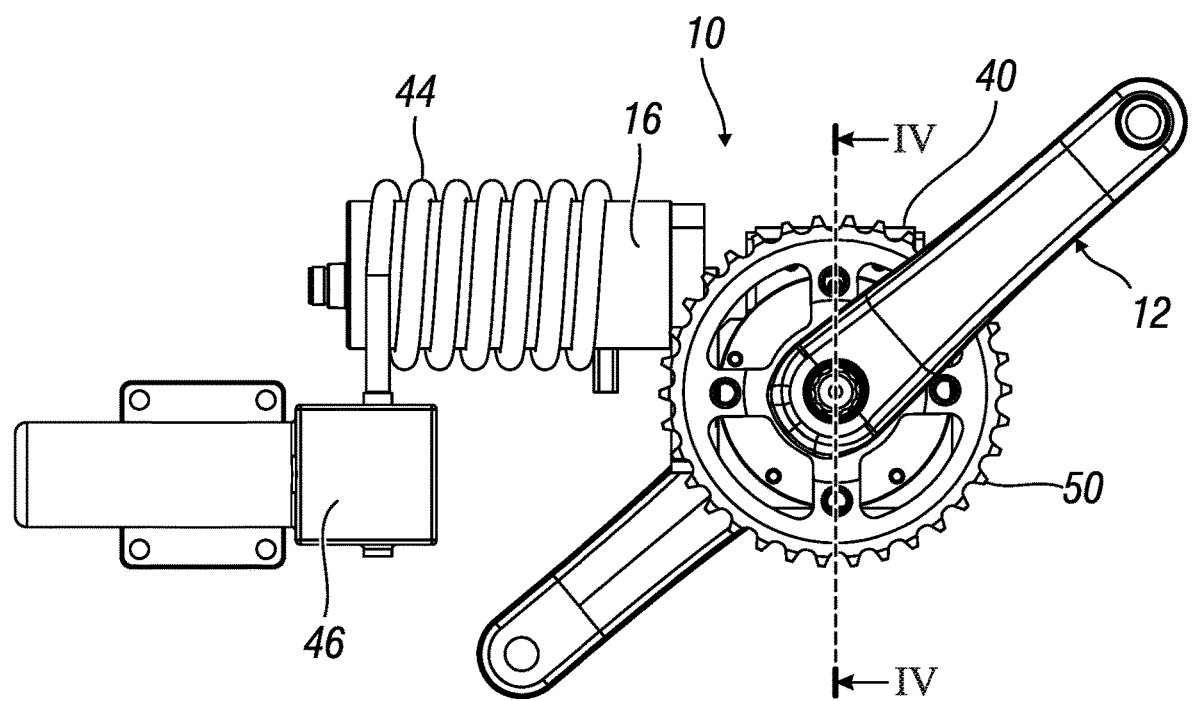
FIG. 3 is a side elevational view of the gearmotor assembly of FIG. 1.

With reference to the figures, shown is a preferred embodiment of the gearmotor assembly for a pedal-assisted bicycle according to the present invention. The gearmotor assembly is indicated in its entirety with reference number 10. The gearmotor assembly 10 is configured to be applied to the pedal crank/pedal assembly 12 of a bicycle (not shown) of the type comprising at least one frame and at least one drive wheel. The drive wheel is connected to the pedal crank/pedal assembly 12 by means of a transmission system which can be of conventional type, such as for example a chain transmission system which comprises one or more toothed chainrings, integrally joined with the pedal crank/pedal assembly 12, and one or more sprockets, integrally joined with the drive wheel.

The bicycle, which is of the per se known type, can therefore be provided with a steering, with at least one front steering wheel, with a braking system, with a saddle and with other possible accessories. The bicycle to which the gearmotor assembly 10 can be applied may also not be of the conventional two-wheel type, but it may consist of a unicycle, a tricycle or a rickshaw, provided that it is provided with a pedal crank/pedal assembly 12 and with a transmission system with at least one drive wheel.

The gearmotor assembly 10 comprises at least one pedal crank shaft 14 which can move with rotary motion around a predefined axis A, typically horizontal and perpendicular to the advancement direction of the bicycle. In a per se known manner, the pedal crank shaft 14 is integrally joined with the pedal crank/pedal assembly 12 to receive the torque delivered by the cyclist through said pedal crank/pedal assembly 12 and to transmit the torque to the drive wheel of the bicycle through the transmission system.

The gearmotor assembly 10 further comprises at least one electric motor 16 provided with an electronic control unit and with its own reduction gear mechanism 18, 20. In a per se known manner, the electronic control unit can be integrated with various expansion modules, such as for example Wi-Fi modules, Bluetooth, GSM, accelerometers, gyroscopes, load cells, etc.

In detail, the reduction gear mechanism 18, 20 is of the type comprising a worm screw 18, integrally joined with the output shaft 42 of the electric motor 16, and a gear wheel 20, arranged coaxially around the pedal crank shaft 14. Still, in a per se known manner, the reduction gear mechanism 18, 20 is configured to receive the torque delivered by the electric motor 16 and to transmit such torque to the driving wheel of the bicycle through the pedal crank shaft 14 and the transmission system, for example of conventional chain type with one or more toothed chainrings and one or more sprockets.

According to the invention, the gearmotor assembly 10 comprises at least one internal overrunning clutch 22, mounted coaxially around the pedal crank shaft 14, and at least one external overrunning clutch 24, mounted coaxially inside the gear wheel 20 of the reduction gear mechanism 18, 20. Both the internal overrunning clutch 22 and the external overrunning clutch 24 consist of respective freewheel mechanisms. As known, a freewheel mechanism is a mechanical device which, interposed between two coaxially rotating assemblies, allows to connect or uncouple these two assemblies according to their relative angular velocity.

Between the external overrunning clutch 24 and the internal overrunning clutch 22 there is interposed at least one hollow tubular element 26 kinematically connected to the drive wheel of the bicycle to transmit the torque delivered by the cyclist or by the electric motor 16 through the reduction gear mechanism 18, 20. In other words, the hollow tubular element 26 is directly connected to the bicycle transmission system, which can be for example of the conventional chain type with one or more toothed chainrings, one of which is shown in FIG. 4 with reference number 50 and it is directly mounted on said hollow tubular element 26, and one or more sprockets.

In particular, the internal overrunning clutch 22 is housed by interference in the hollow tubular element 26, while the external overrunning clutch 24 is housed by interference outside such hollow tubular element 26. The internal overrunning clutch 22 is configured to transmit torque in a first direction of rotation of the pedal crank shaft 14, while the external overrunning clutch 24 is configured to transmit torque in a second direction of rotation of the pedal crank shaft 14 which is opposite to the first direction of rotation.

Figure 4:
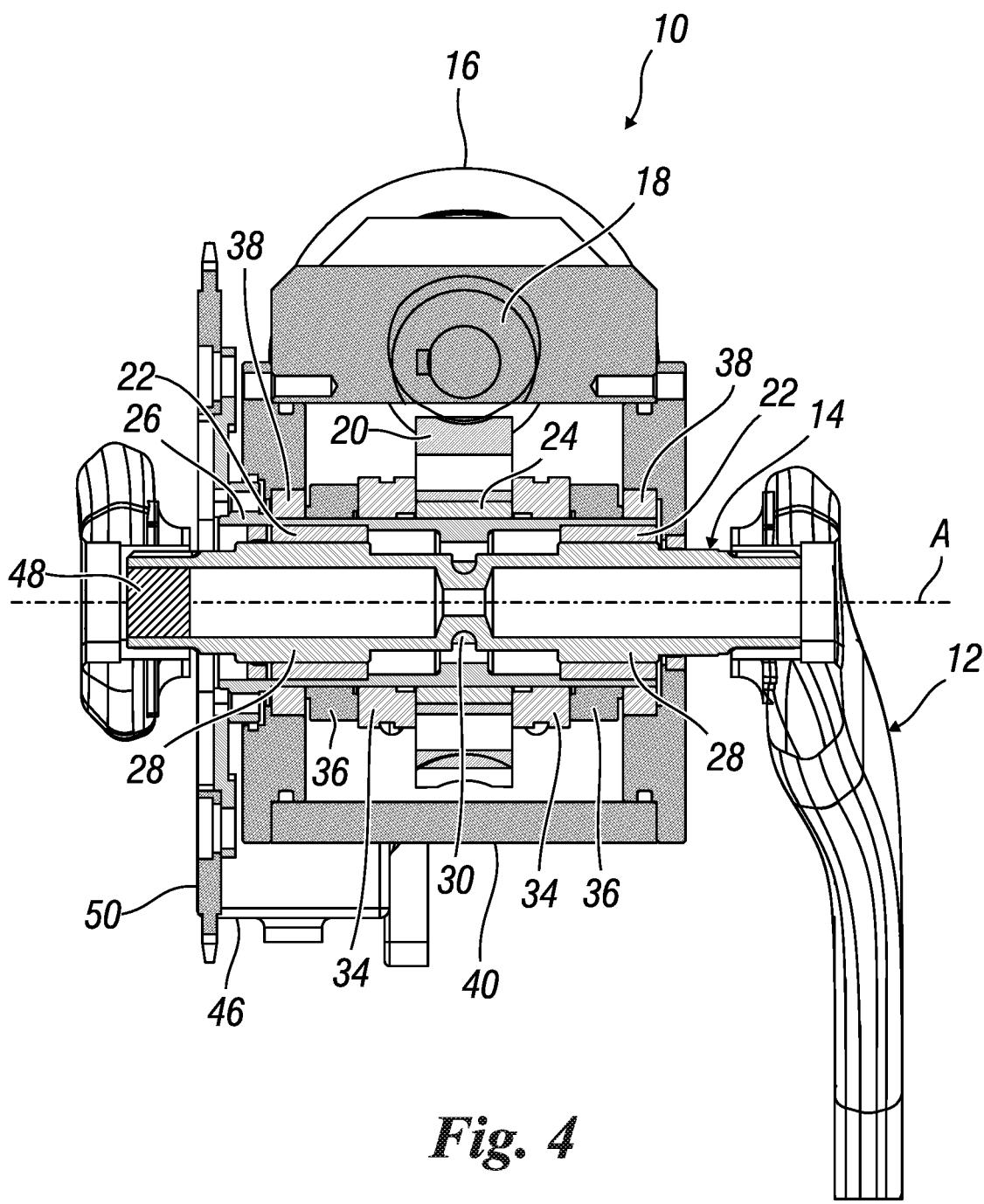
FIG. 4 is a sectional view, obtained along the line IV-IV of FIG. 3, of the gearmotor assembly of FIG. 1.
Figure 5:
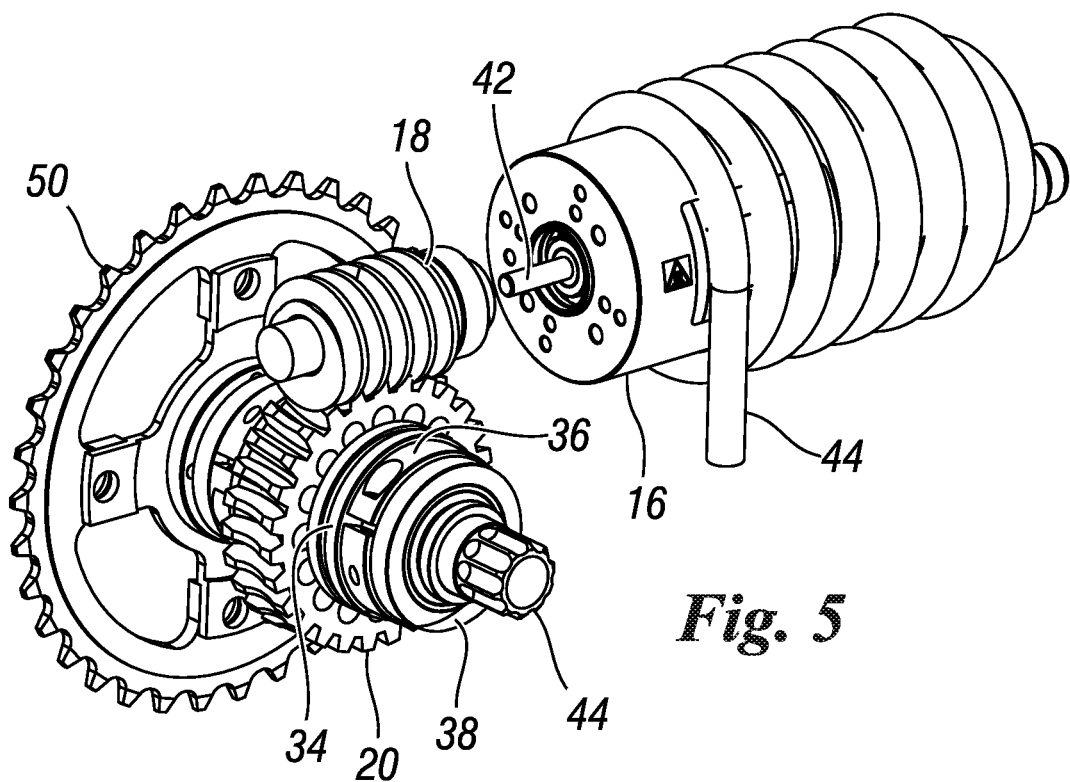
FIG. 5 is a partly exploded view of a part of the components of the gearmotor assembly of FIG. 1.

In detail, as shown in the sectional view of FIG. 4, the pedal crank shaft 14 is provided with two opposite rectified seats 28, around each of which a respective internal overrunning clutch 22 is mounted by interference. The gearmotor assembly 10 is therefore preferably provided with two distinct internal overrunning clutches 22 placed directly at contact with the pedal crank shaft 14.

The hollow tubular element 26, which forms the outer housing of the two internal overrunning clutches 22, preferably consists of a rectified tube around which it centrally houses, i.e. in a median position between the two internal overrunning clutches 22, the gear wheel 20 within which a single external overrunning clutch 24 is coaxially mounted. In other words, as shown in FIG. 4, the external overrunning clutch 24 is interposed between the gear wheel 20, which surrounds it, and the hollow tubular element 26.

The two internal overrunning clutches 22 are configured to lock in the same direction of rotation, which coincides with the first direction of rotation of the pedal crank shaft 14. On the other hand, the external overrunning clutch 24 is configured to lock in the opposite direction of rotation, which coincides with the second direction of rotation of the pedal crank shaft 14.

Figure 6:
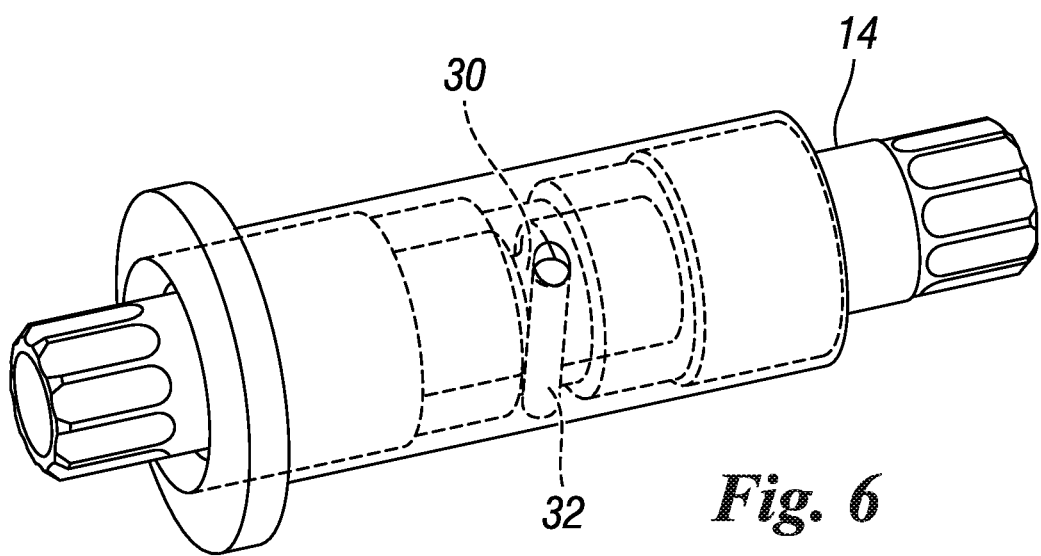
FIG. 6 is a transparency view of another part of the components of the gearmotor assembly of FIG. 1.

Preferably, as shown in FIG. 6, the pedal crank shaft 14 is centrally provided, at the external overrunning clutch 24 and at the gear wheel 20, with at least one radial groove 30 forming a housing for at least one pin 32. The pin 32 has a function for centring the pedal crank shaft 14, i.e. avoiding the displacements thereof in the axial direction, and it allows the freedom of rotation backwards, i.e. in the second direction of rotation, of the pedal crank/pedal assembly 12.

A respective axial bearing 34, which is engaged around the hollow tubular element 26, is positioned on both sides of the gear wheel 20, with reference to the predefined axis A of the pedal crank shaft 14. Each axial bearing 34 is held in place by a corresponding spacer element 36. Lastly, positioned on the outer sides of the two spacer elements 36 are two further bearings 38 which, besides holding all the elements of the gearmotor assembly 10 which are coaxial with respect to the pedal crank shaft 14 in position, guarantee the freedom of rotation of said pedal crank shaft 14 in both directions.

Thus, the gearmotor assembly 10 according to the present invention operates as follows. The two internal overrunning clutches 22, which are mounted between the hollow tubular element 26 and the pedal crank shaft 14, are locked during the normal pedaling. The hollow tubular element 26 is then rotated by the pedal crank/pedal assembly 12 and it transmits the torque to the toothed chainring 50.

Still during normal pedaling, the external overrunning clutch 24, which is mounted between the gear wheel 20 of the reduction gear mechanism 18, 20 and the hollow tubular element 26 and which is locked in the opposite direction with respect to the two internal overrunning clutches 22, is instead free. Thus, both the electric motor 16 and the reduction gear mechanism 18, 20 are freed from the bicycle transmission system and the pedaling is fluid.

When the electric motor 16 intervenes, together with the reduction gear mechanism 18, 20, the external overrunning clutch 24 is engaged, driving the hollow tubular element 26, and therefore the toothed chainring 50 too, in the same direction of rotation as the pedaling. Even if the electric motor 16 and the reduction gear mechanism 18, 20 were to rotate faster than their predefined maximum limit (this is a hypothetical situation, since the electronic control unit would intervene to bring the rotation regimen back to the predefined maximum limit), they would still not drive the pedal crank/pedal assembly 12, given that the two internal overrunning clutches 22 would be unlocked with respect to the pedal crank shaft 14. On the contrary, should the cyclist pedal at a very fast frequency, the cyclist would block the two internal overrunning clutches 22 arranged around the pedal crank shaft 14, but releasing the external overrunning clutch 24 arranged in the gear wheel 20 of the reduction gear mechanism 18, 20. In any case, the result is always that of obtaining a pedaling that is free from the electric motor 16 and that is as natural as possible.

The gearmotor assembly 10 is provided with a crankcase 40 housing the pedal crank shaft 14, the entire reduction gear mechanism 18, 20 and the internal 22 and external 24 overrunning clutches, together with the respective additional components (bearings, spacer elements, etc.). In other words, only the electric motor 16 of the gearmotor assembly 10 is located outside the crankcase 40 to connect to the reduction gear 40, while the respective output shaft 42 is at least partially inserted into said crankcase 40 to connect to the reduction gear mechanism 18, 20.

Since it is separated from the electric motor 16, the reduction gear mechanism 18, 20 is therefore far from the heat source constituted by the electric motor 16. Furthermore, the fact that the worm screw 18 is positioned tangentially with respect to the gear wheel 20, as well as orthogonally with respect to the rotation axis A of the pedal crank shaft 14, makes the electric motor 16 free to be positioned at any angle (up to 360°) with respect to the bicycle frame.

The electric motor 16 can be provided with a cooling system which comprises a hydraulic circuit 44, which at least partially surrounds such electric motor 16, and at least one pump 46, arranged to circulate a cooling fluid at a predefined pressure inside the hydraulic circuit 44. The pump 46 can be driven by the output shaft 42 of the electric motor 16, or it can be driven autonomously and powered by the battery pack normally provided on the pedal-assisted bicycle.

Since the electric motor 16 is preferably of the brushless type and it is contained in a cylindrical casing, the hydraulic circuit 44 is preferably serpentine-shaped for externally winding the largest possible surface of the casing of said electric motor 16. One or more dissipating elements (not shown) mounted at the casing of the electric motor 16 may also be provided for. Thanks to the forced cooling of the electric motor 16 it is possible to use a much smaller brushless motor, in terms of size and power, and with lesser weight with respect to the conventional electric motors for pedal-assisted bicycles, without reducing the efficiency and performance under load. In addition, considering the same available power, the battery pack will last longer.

The pedal crank shaft 14 can be provided with at least one torque sensor 48, such as for example a torque meter, operatively connected to the electronic control unit and preferably positioned at the toothed chainring 50. Besides measuring the torque, this torque sensor 48 is particularly advantageous when starting from standstill, especially when pedaling uphill or on muddy ground. As a matter of fact, this torque sensor 48 proportionally detects the torque applied by the cyclist on the pedal crank/pedal assembly 12 and, interfacing with the electronic control unit, it allows the selective activation of the electric motor 16 so as to guarantee a standing start without effort.

In general, the current electric motors for pedal-assisted bicycles are not provided with torque sensors, but with simple sensors of the angular velocity of the pedal crank shaft. Thus, in standing starts of the current assisted-pedal bicycles, it is necessary to push a lot on the pedal crank/pedal assembly and then slightly drive the pedal crank shaft in rotation and allow the angular velocity sensor to identify even the least speed and therefore to make the electric motor intervene.

It has thus been seen that the gearmotor assembly for a pedal-assisted bicycle according to the present invention attains the objects outlined above.

The gearmotor assembly for a pedal-assisted bicycle according to the present invention thus conceived is susceptible in any case to numerous modifications and variations, all of which fall within the scope of the same inventive concept; furthermore, all the details may furthermore be replaced with technically equivalent elements. Basically, the materials used as well as the shapes and dimensions may vary according to the technical needs.

The scope of protection of the invention is therefore defined by the attached claims.

The invention claimed is:

1. A gearmotor assembly (10) for a bicycle comprising at least one frame, at least one drive wheel and at least one pedal crank/pedal assembly (12), the gearmotor assembly (10) comprising:
   at least one pedal crank shaft (14) movable by rotary motion around a predefined axis (A), said at least one pedal crank shaft (14) being integrally joined with the pedal crank/pedal assembly (12) for receiving the torque delivered by the cyclist through said pedal crank/pedal assembly (12) and for transmitting said torque to said at least one drive wheel;
   at least one electric motor (16) provided with an electronic control unit;
   at least one reduction gear mechanism (18, 20) comprising a worm screw (18), integrally joined with the output shaft (42) of said at least one electric motor (16), and a gear wheel (20), arranged coaxially around said at least one pedal crank shaft (14), said at least one reduction gear mechanism (18, 20) being configured to receive the torque delivered by said at least one electric motor (16) and to transmit said torque to said at least one drive wheel by means of said at least one pedal crank shaft (14);
   at least one internal overrunning clutch (22), mounted coaxially around said at least one pedal crank shaft (14), and configured to transmit torque in a first direction of rotation of said at least one pedal crank shaft (14), and
   at least one external overrunning clutch (24), mounted coaxially in said gear wheel (20) and configured to transmit torque in a second direction of rotation of said at least one pedal crank shaft (14) which is opposite with respect to said first direction of rotation,
   wherein at least one hollow tubular element (26) kinematically connected to said at least one drive wheel for transmitting said torque is interposed between said at least one external overrunning clutch (24) and said at least one internal overrunning clutch (22), the gearmotor assembly (10) being characterised in that said at least one internal overrunning clutch (22) is housed by interference inside said at least one hollow tubular element (26) and said at least one external overrunning clutch (24) is housed by interference outside said at least one hollow tubular element (26), wherein said at least one pedal crank shaft (14) is provided with two opposite rectified seats (28), around each of which a respective internal overrunning clutch (22) is mounted by interference, thus, said gearmotor assembly (10) being provided with two distinct internal overrunning clutches (22) arranged directly at contact with said at least one pedal crank shaft (14), and wherein said at least one hollow tubular element (26) forms the outer housing of said two internal overrunning clutches (22) and it comprises a machined tube with seats which centrally holds in a median position between said two internal overrunning clutches (22), said gear wheel (20) inside which a single external overrunning clutch (24) is coaxially mounted, so that said single external overrunning clutch (24) is interposed between said gear wheel (20), which surrounds it, and said at least one hollow tubular element (26).

2. The gearmotor assembly (10) according to claim 1, characterised in that positioned on both sides of said gear wheel (20), with reference to said predefined axis (A), is a respective axial bearing (34) which is engaged around said at least one hollow tubular element (26), each axial bearing (34) being held in position by a corresponding spacer element (36).

3. The gearmotor assembly (10) according to claim 2, characterised in that positioned on the outer sides of the two spacer elements (36) are two further bearings (38) which, besides holding all the elements of the gearmotor assembly (10) which are coaxial with respect to said at least one pedal crank shaft (14) in position, they guarantee the freedom of rotation of said at least one pedal crank shaft (14) in both directions.

4. The gearmotor assembly (10) according to claim 1, characterised in that said at least one pedal crank shaft (14) is centrally provided, at said at least one external overrunning clutch (24) and said gear wheel (20), with at least one radial groove (30) forming a housing for at least one pin (32), said pin (32) having a function for centring said at least one pedal crank shaft (14), i.e. avoiding displacements thereof in the axial direction, and allowing the freedom of rotation backwards, that is in said second direction of rotation, of said pedal crank/pedal assembly (12).

5. The gearmotor assembly (10) according to claim 1, characterised in that it comprises a crankcase (40) in which said at least one pedal crank shaft (14), the entire reduction gear mechanism (18, 20) and said internal (22) and external (24) overrunning clutches are housed, so that only said at least one electric motor (16) is outside said crankcase (40), while the respective output shaft (42) is at least partially inserted into said crankcase (40) to connect to said reduction gear mechanism (18, 20).

6. The gearmotor assembly (10) according to claim 1, characterised in that said at least one electric motor (16) is provided with a cooling system comprising a hydraulic circuit (44), which at least partially surrounds said at least one electric motor (16), and at least one pump (46), arranged to circulate a cooling fluid at a predefined pressure inside said hydraulic circuit (44).

7. The gearmotor assembly (10) according to claim 6, characterised in that said at least one electric motor (16) is of the brushless type and it is contained in a cylindrical casing, said hydraulic circuit (44) having a serpentine shape for externally winding the largest possible surface of the casing of said electric motor (16).

8. The gearmotor assembly (10) according to claim 1, characterised in that said at least one pedal crank shaft (14) is provided with at least one torque sensor (48) operatively connected to the electronic control unit, said at least one torque sensor (48) proportionally detecting the torque applied by the cyclist on said pedal crank/pedal assembly (12) and, interfacing with said electronic control unit, allowing the selective activation of said at least one electric motor (16) so as to guarantee a standing start without effort.

\* \* \* \* \*